3,309,911
HYDRAULICALLY OPERATED CONTROLLED STROKE GUN HEAD
Walter R. Simmons, Buena Park, Calif., assignor to Textron Industries, Inc., a corporation of Delaware
Filed June 8, 1964, Ser. No. 373,420
11 Claims. (Cl. 72—391)

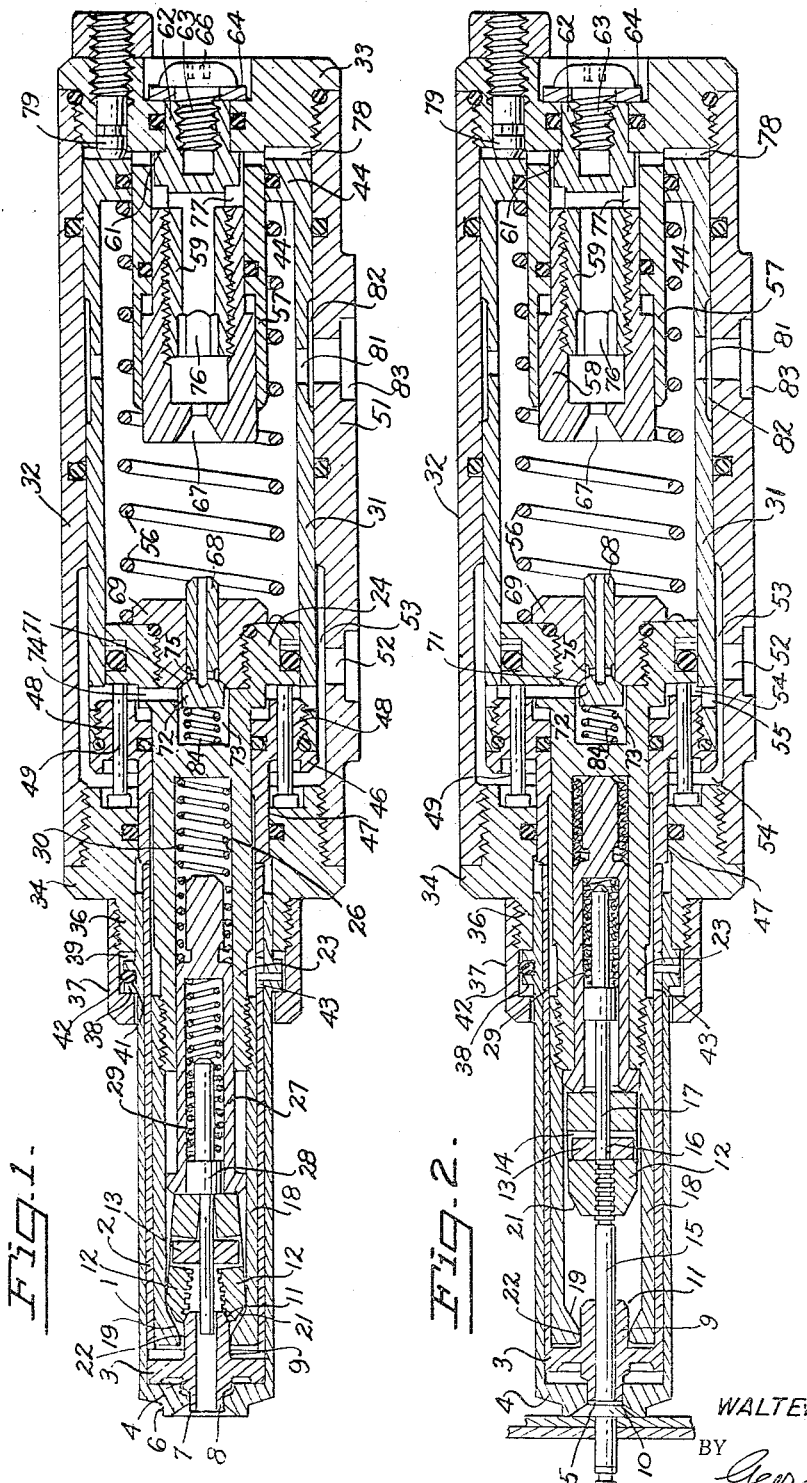

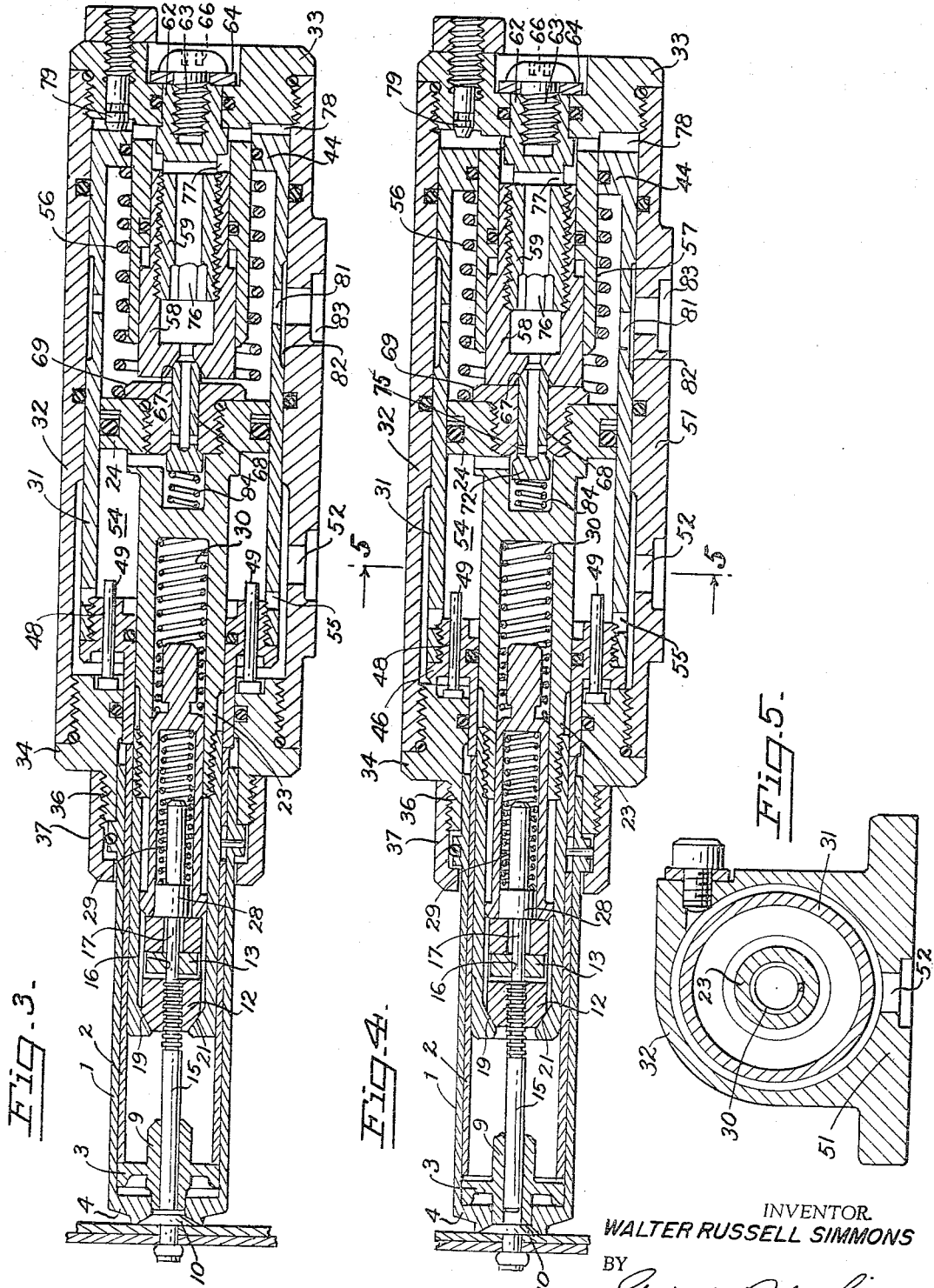

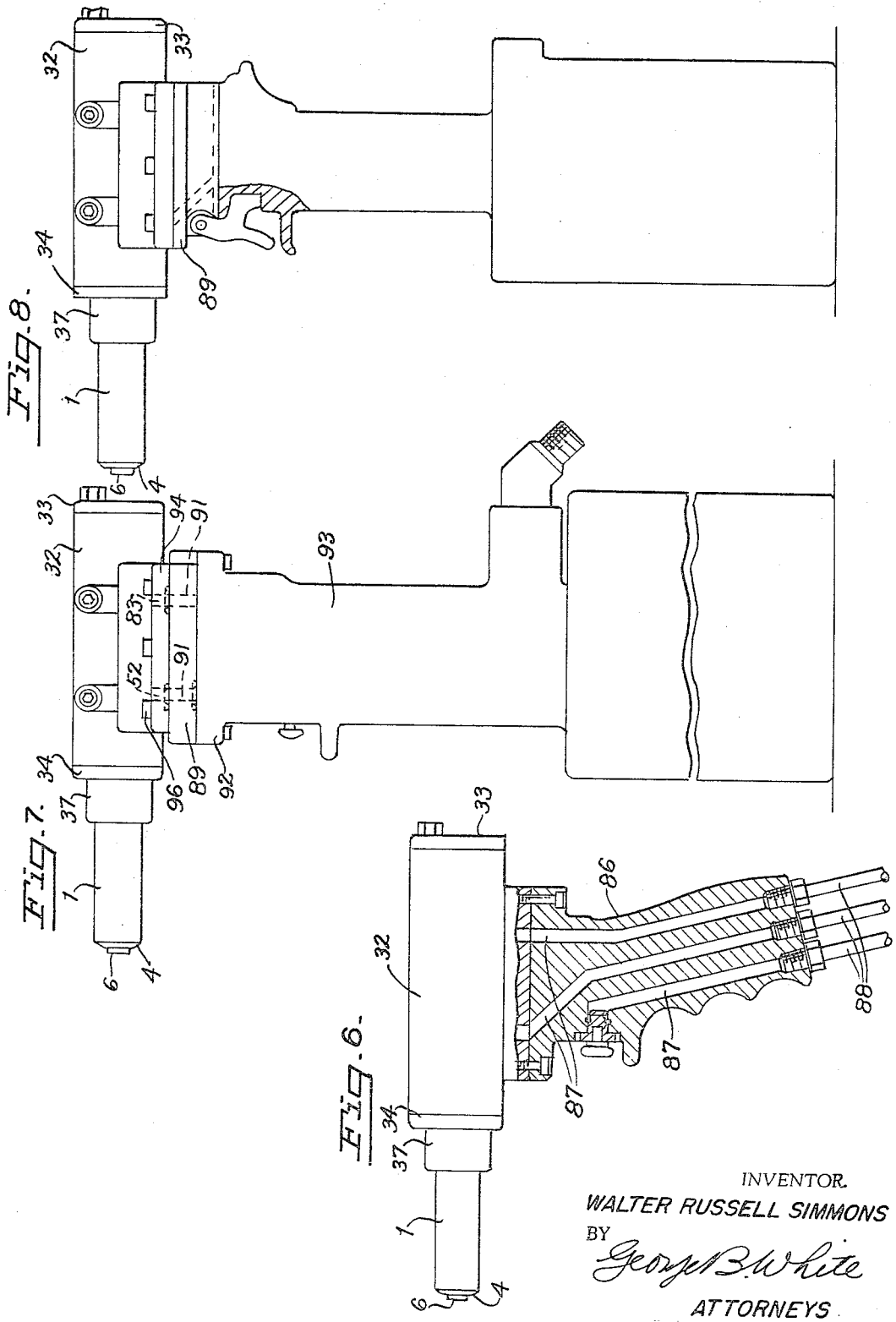

This invention relates to hydraulically operated controlled stroke gun head.

Particularly this invention pertains to the means of installing a locked stem blind rivet wherein the stem must be pulled to a predetermined position to set the rivet, at which point part of the reaction force is shifted from the outer member bearing against the rivet head to an inner member which forces a lock into the rivet to lock the stem and the tubular rivet together, and then the pull of the stem is continued until the stem breaks substantially flush with the rivet head. The type of operation of pressing such a lock, namely a locking sleeve or locking ring around the stem into a recess in the rivet head, is illustrated in the U.S. Patent No. 3,038,626 of Walter R. Simmons dated June 12, 1962.

One of the improvements of the herein invention over the mechanism shown in said prior patent is that the load shifting operation is accomplished by a forward pressing on the collar or ring setting anvil member or sleeve, while the stem is positively held at a predetermined pulled position. In said prior patent the support for the outer pressure member or sleeve was removed by a tripping operation which transferred the load from the outer sleeve or pressure member to the inner stationary anvil. In said peviously patented device there was a tendency for a short period of time to relax the effective pull on the stem in relation to the rivet during the interval between the tripping and releasing of the outer pressure member or sleeve and the picking up of the load by the inner anvil. In the present invention this momentary release of load on the stem is obviated.

A feature of this invention is that the stem pulling piston operates within a shift piston which latter pushes the anvil into the head of the rivet, and the shift piston is actuated by a valve which is opened when the stem pulling piston reaches the end of a predetermined pull stroke; a further feature is that the tension of the stem pulling piston is maintained, as well as the pressure on the rivet head, at all times while the shift piston force is applied to the anvil and that after the anvil has moved sufficiently to lock the stem, the anvil exerts further pressure on the pressure element on the head to cause the breaking of the stem.

Another feature of the invention is the adaptability of this pulling head to be used in various types of riveting guns operated by a pressure medium.

Other advantages and objects of this invention are the simplification of the operation and structure of such gun head, the adaptability of the gun head to be used in connection with various types of existing guns, the positiveness of operation; the facility of adjustment or presetting of the stroke of pulling the stem.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a sectional view of the gun head assembly showing the pulling piston in the forward position after the ejection of the broken rivet stem and ready for the insertion of the stem of a rivet.

FIG. 2 is a sectional view of the gun head assembly in the position where the rivet stem is inserted and the jaw device was pushed back to close on the rivet stem.

FIG. 3 is a sectional view showing the pulling piston nearing the end of its stroke wherein the rivet is set.

FIG. 4 is a sectional view showing the shifting piston in the forward position after the anvil had been operated and the pressure sleeve had been pushed relatively forward to cause the breaking of the stem.

FIG. 5 is a cross-sectional view of the pulling head, the section being taken on lines 5—5 of FIG. 4.

FIG. 6 is a partly sectional view of the pulling head mounted on an operating grip handle which is connectable by flexible tubes to either of the gun assemblies as shown in FIGS. 7 and 8.

FIG. 7 is an outline view of the attachment of the pulling head on an hydraulic gun assembly.

FIG. 8 is an outline view of the attachment of the pulling head by an adapter to another type of hydraulic gun assembly.

The pulling head herein includes an outer sleeve 1 in which is slidable a tube 2. In front of the tube 2 is an anvil 3 slidable in the sleeve 1. The sleeve is provided with a nose 4 with a pressure projection 6 adapted to bear against the head of the rivet to be set. The sleeve nose 4 has an axial hole 7 therethrough.

A tubular anvil nose 8 extends into the hole 7 so that in the proper relative position the anvil nose 8 may engage the collar or locking sleeve 5 to be pressed into the recess in a rivet head 10. On the other side of the anvil 3 is a tubular extension 9 which has a frustoconical tapered tip 11 for opening the gripping jaws 12 in a manner hereinafter described.

There are two complemental gripping jaws 12 held in alignment by a stem stop 13 which is loosely held in suitable apertures 14 in the bodies of the jaws 12 so as to permit the spreading of the jaws apart from the position shown in FIG. 2 to the position shown in FIG. 1 for the purpose of receiving or releasing the rivet stem 15. The stem stop 13 has a hole 16 therethrough to accommodate a stem ejector pin 17.

The jaws 12 are confined in a collet 18. The frustoconical inner end 19 of which engages the correspondingly tapered tips 21 of the jaws 12 for pressing them together on the stem 15 in the pulling attitude of the device. The nose end of the collet 18 has a hole 22 to permit the introduction of the extension 9 for pressing the jaws 12 rearwardly away from said end 19 and prying the jaws 12 apart as shown in FIG. 1. The collet 18 is tubular and is slidable in the inner tube 2.

The rear end of the collet 18 is threaded on the forward end of the rod 23 of a piston 24 so that when the piston 24 is moved toward the pressure nose 4 the collet 18 and the jaws therein are also moved in the same direction, and when the piston 24 is forced rearwardly away from the pressure nose 4, then the collet 18 and the jaws 12 move therewith to pull the rivet stem 15 gripped in the jaws 12 for setting the rivet as described in my said patent. The piston rod 23 has a tubular recess 26 therein in which is slidable a hollow jaw pusher 27. The ejector pin 17 has an abutment collar 28 thereon slidable in the hollow jaw pusher 27. The collar 28 on the ejector pin 17 bears against the rear ends or base of the jaws 12. An ejector spring 29 in the hollow jaw pusher 27 bears against the collar 28 to press the ejector pin 17 to the forward ejecting position. A jaw spring 30 in the tubular recess 26 of the piston rod 23 presses the jaw pusher 27 against the base of the jaws 12. When the rivet stem 15 is inserted between the jaws 12 it abuts the stem stop 13 and pushes the jaw assembly so as to compress the jaw spring 30 as shown in FIG. 2. Thus the jaws 21 are pushed off the anvil extension 9 and close upon the rivet stem 15.

The piston 24 reciprocates within a tubular shift piston 31, which latter in turn reciprocates in a cylindrical body 32. The rear end of the cylindrical body 32 has a base cap 33 threaded therein. The forward end of this cylindrical body has an end cap 34 threaded therein. On the end cap 34 is an externally threaded boss 36 on which is threadedly secured a nose cap 37. The sleeve 1 extends through the nose cap 37 and into the boss 36. The sleeve 1 has an annular collar 38 thereon slidable in the nose cap 37. The space between the end of the boss 36 and the end of the nose cap 37 is wider than the width of the collar 38 so as to leave an annular clearance 39 in the nose cap 37. This clearance 39 permits the sleeve 1 to float a limited distance relatively to the nose cap 37 and the body 32. In an annular slot 41 of the collar 38 is a circular retainer ring 42, an end of which extends through the bottom of the slot 41 into a longitudinal slot 43 on the adjacent portion of the tube 2. This serves to hold the sleeve 1, tube 2 and anvil 3 together as a unit when removed from the gun head. The slot 43 allows for some relative axial motion between sleeve 1 and tube 2.

The shift piston 31 has a closed bottom 44 at its rear end and it has a shift piston cap 46 threaded into its front end. A tubular nose 47 extends from the shift piston cap 46 slidably through the end cap 34 so as to abut against the rear end of the anvil tube 2. When the shift piston 31 is pushed forward its nose 47 pushes the anvil tube 2 forward against the anvil 3 to apply the pressure for the pressing of the locking sleeve or collar 8 into the rivet head 12 as heretofore described. The anvil 3 abuts the nose 4 of the sleeve 1, moving it forward to substantially close the gap 39. This last mentioned relative movement of the sleeve 1 provides the final force for breaking the stem 15. Forward motion of the shift piston 31 is limited, by shift piston cap 46 abutting end cap 34 as seen in FIG. 4.

A plurality of stop pins 48 extend slidably through holes 49 in the shift piston cap 46. The stop pins 48 abut against the end cap 34 of the body 32 and at their outer end the stop pins 48 project into the cavity of the shift piston 31 so as to operate as stops for the piston 24.

The body 32 has a flat base 51 which fits on guns in a manner to be hereinafter described. In the base 51 is an intake port 52 suitably aligned with a pressure conduit. There is an annular space 53 formed in the inner periphery of the body 32 around the shift piston 31 adjacent said intake port 52. The annular space or clearance 53 extends to the end cap 34 and into the space between said end cap 34 and the shift piston cap 46. When fluid under pressure is admitted through the intake port 52 it exerts pressure through the cavity 54 on the piston 24 so as to press the piston 24 toward the bottom 44 of the shift piston 31. Side ports 55 on the shift piston 31 admit the pressure medium into the cavity 54. A piston spring 56 coiled around the tubular stem 57 of the base cap 33 bears at one end against the bottom 44 of the shift piston 31 and at its other end against the pull piston 24 to urge the pistons in opposite directions.

Inside the end cap stem 57 is slidable a shift stop 58. An adjusting screw 59 is threaded into the center of the shift stop 58 and has a shoulder 61 which abuts against the inner face of the base cap 33. A reduced neck 62 of the adjusting screw 59 is journalled in the base cap 33. A socket screw 63 is tightly screwed into a threaded socket in the neck 62 of the adjusting screw 59. The head of the socket screw 63 bears against a washer 64 tightly so that when the screw is tightened in position the adjusting screw 59 can be turned in either direction by engaging the usual socket 66 in the end of the socket screw and by turning it in either direction. Such turning will turn the adjusting screw 59 and accordingly will adjust the position of the shift stop 58 thereby determining the extent of travel of the piston 24.

In the front end of the shift stop 58 is a valve seat 67 in which is seated a tubular valve stem 68. The tubular valve stem 68 slidably extends through the center of a valve gland 69 which latter is threadedly secured in the piston 24. At the end of the valve gland 69 in the piston 24 is another valve seat 71 on which can be seated a valve 72 movable within a hole 73 in the piston rod 23. Lateral ports 74 in the piston rod 23 at the piston 24 communicate the cavity 54 with the hole 73. The valve stem 68 communicates through a passage 76 of the adjusting screw 59 and lateral ports 77 in the base cap stem 57 with a space or cavity 78 between the bottom 44 of the shift piston 31 and the base cap 33. In the position of the piston 24 when it abuts against the shift stop 58 the valve stem 68 is pushed back into the valve gland 69 to keep the valve 72 open. Therefore pressure medium flows through the cavity 54, ports 74, then through ports 75 of the valve 72, the passage in the valve stem 68 then through the adjusting screw passage 76 and ports 77 into the cavity 78 behind the bottom 44 of the shift piston 31. In this position the pressure medium exerts pressure on the bottom 44 of the shift piston 31 and moves forward the shift piston cap 46 so that the nose 47 thereof transmits pressure to the tube 2 and to the anvil 3 for the locking sleeve setting operation. As the pressure medium is shut off the piston spring 56 urges the shift piston 31 back against the end of an adjustment screw 79 extended through the base cap 33, and the piston spring 56 also presses the piston 24 in the forward direction away from the shift piston bottom 44 thereby unseating the valve stem 68 to allow the escape of residual fluid into cavity of the shift piston 31 and from there through ports 81 and an annular recess 82 in the outer periphery of the shift piston 31 to the outlet port 83 through the base 51. A valve spring 84 in the valve chamber 73 presses the valve 72 so as to seat it on the valve seat 71 and thereby prevent escape of fluid from the cavity 54.

In operation the piston spring 56 as it expands pushes the piston 24 into the initial forward position shown in FIG. 1. In that position the piston rod 23 is pushed forward in the anvil tube 2 and pushes the anvil 3 completely forward against the nose 4 of the sleeve 1. The tubular extension 9 enters into the collet 18 and prys the jaws 21 apart for receiving the rivet stem 15. Then the rivet stem 15 is inserted and pushes the ejector pin 17 against the action of the ejector spring 29. Then the rivet stem 15 abuts the stem stop 13 and pushes the jaw assembly into the position shown in FIG. 2. The point 6 of the nose 4 is pressed against the tubular rivet head 10.

Pressure medium is admitted through the intake port 52 and into the annular space 53 and through the side ports 55 into the cavity 54. The stop pins 48 keep the piston 24 spaced from the shfit piston cap 46 to allow the pressure medium to get in front of the piston 24 and push the piston 24 rearwardly within the shift piston 31. In this position the valve 72 is kept closed by the valve spring 84. As the piston 24 is so moved rearwardly it pulls the collet nose 18 against the tapered jaw tips 21 for gripping the rivet stem 15 more firmly. As the piston 24 moves rearwardly it pulls the collet and the jaw assembly and the rivet stem 15 for setting the rivet, as shown in FIG. 3.

When the piston 24 reaches the end of the shift stop 58 so that the head of the valve gland 69 abuts against the end of the shift stop 58, the tubular valve stem 68 is seated in the shift stop valve seat 67 and the tubular valve stem 68 and the valve 72 are pushed to compress the valve spring 84 thereby to unseat the valve 72 and expose the side ports 75, as shown in FIG. 4. The pressure fluid then flows into and through the tubular valve stem 68 and through the shift stop 58 and adjustment screw 59, and ports 77 to the cavity or space 78 behind the shift piston bottom 44 and pushes the shift piston 31 forwardly, thereby further compressing the piston spring 56. The pushing of the shift piston 31 moves the shift piston cap 46 and its stem 47 forwardly and against the anvil tube 2 which latter in turn transmits the pressure to the anvil 3 and presses the anvil nose 8 against the locking collar or sleeve 5 of the rivet for swaging or pressing the said collar 5 into the rivet head 10. After the anvil 3 is pushed sufficiently far to abut the sleeve nose 4 then it also exerts pressure on the sleeve nose 4 and pushes the sleeve 1 relatively to clearance in nose cap 37 so that the reaction force moves the body 32 and pistons therewith to break the stem 15 as shown in FIG. 4.

In this manner the application of pressure to the anvil 3 is accomplished automatically, quickly and smoothly after a predetermined rivet setting stroke of the pulling piston 24. While the load to seat the locking collar and finally to break the stem is applied by the forward pushing on the anvil tube 2, the stem 15 is positively maintained under tension at the predetermined pulled position, and the sleeve nose 4 is pressed at all times against the rivet head 10.

The anvil 3 and the anvil tube 2 are normally free to move in the sleeve 1. The anvil tube 2 bears against the anvil 3 and is forced to a forward position by the action of the shift piston 31. When the shift piston 31 is moved to its rearward position by the action of the piston spring 56, it leaves the anvil tube 2 and the anvil 3 free to move in the sleeve 1. When the next rivet stem is inserted through the anvil 3 it pushes the anvil 3 and the tube 2 rearwardly as heretofore described and as shown in FIG. 2.

When the socket screw 63 is threaded into the end of the reduced neck 62 of the shift screw 59 it is shouldered against the washer 64. This socket screw 63 is tightened to press the washer 64 against the end of the reduced neck 61 so that there is no substantial relative motion between the shift screw 59 and the washer 64 and the socket screw 63. The length of the reduced neck 62 between the shoulder 61 of the shift screw 59 and the washer 64 is only slightly greater than the thickness of the adjacent wall of the base cap 33 so as to allow the shift screw 59 to be turned in either direction by applying torque to the socket screw 63. No substantial torque is required for this motion therefore there is no substantial tendency to loosen the socket screw 63 from the end 62 of the shift screw 59. The shift stop 58 is polygonal, in the present illustration hexagonal, slidably fitting into correspondingly hexagonal socket of the inward extension of the base cap 33 so that by rotating the shift screw 59 the shift stop 58 is moved axially in the selected direction for determining the shifting position of the pressure force from the sleeve 1 to the anvil 3 as aforesaid.

In FIG. 6 is shown the attachment of the aforesaid pulling head to a piston grip body 86 with a button control. In this instance the passages 87 in the grip body 86 for pressure fluid, reservoir and air are connected by respective flexible conduits 88 to suitable supply ports preferably to the corresponding outlets or passages of the comparatively heavy gun shown in FIG. 7 and shown in detail in Patent No. 3,039,270.

In FIG. 7 the pulling head is mounted by means of an adapter 89 on a gun of the type illustrated in said U.S. Patent No. 3,039,270. This adapter 89 is a plate with holes 91 aligned with the respective ports on the top 92 of the gun 93 and communicating with the respective ports 52 and 83 in the flange 94 of the body of the pulling head. The flange 94 is provided with suitable bolt holes for accommodating bolts 96 for mounting the pulling head on the adapter 89.

The illustration shown in FIG. 8 shows similar adapter 89 mounting the pulling head on a gun of the type shown in Patent No. 2,526,956. In the forms shown in FIG. 7 and FIG. 8 the pulling head is actuated by manipulating the respective button or trigger controls of the respective guns.

I claim:
1. In a device for setting a rivet of the type wherein a first element is pulled and reaction force is applied to a second element to clinch the work and wherein means are coacting with said elements under reaction force to interlock said elements;
  (a) means for pulling said first element
  (b) a pair of pressure members one within the other being movable relatively to one another to apply reaction force sequentially in the direction of the second element
  (c) means for directing reaction force to the outer pressure member
  (d) means activated by said pulling means after a predetermined stroke of pull of said pulling means to direct reaction force to the inner pressure members and to said coacting means for interlocking said elements,
  (e) and coacting means between said pressure members to apply pressure to the outer pressure member through said inner pressure member after the interlocking of said element thereby to break said first element.

2. The rivet setting device defined in claim 1 and said directing means including
  (f) a holder casing
  (g) said outer pressure member being an outer sleeve extended from said holder casing with freedom of limited movement relatively to the casing
  (h) the inner pressure member being an anvil and an anvil tube reciprocable in said outer sleeve.

3. The rivet setting device defined in claim 2 and said coacting means between said pressure members being
  (i) a pressure nose on said outer sleeve engageable by said anvil at the end of the interlocking stroke of said anvil,
  (j) said anvil being extensible through said nose and abutting said nose after the interlocking of said elements.

4. In a device for setting fasteners wherein a securing stem is pulled through a head of the fastener while reaction force is applied to said head and wherein a locking collar is pressed into said head and around said stem after the fastener is set for locking said stem and head together;
  (a) a holder casing
  (b) an outer sleeve extended from said casing and held by said casing so as to be pressed against said head
  (c) a nose on said outer sleeve fitting over said head to exert reaction force thereon when said casing and sleeve are pressed toward said head
  (d) an inner member reciprocable in said outer sleeve
  (e) an anvil engaged by said inner member and extended through the nose of said outer sleeve and being capable of applying reaction force to said locking collar to press it into said head and around said stem for locking the same together
  (f) gripping and pulling means reciprocable inside said inner member for engaging and pulling said stem inserted through said nose and through said anvil
  (g) power means to pull said gripping and pulling means while reaction force is applied through the nose of said outer sleeve
  (h) and means actuated by said power means after a predetermined stroke of said gripping and pulling means to apply reaction force to said inner member and to said anvil.

5. The rivet setting device defined in claim 4, and
  (i) said anvil at the end of its forward stroke bearing against and pressing said outer sleeve forwardly (j) means connecting said outer sleeve to said casing with freedom of limited relative movement between said outer sleeve and said casing when further reaction force is applied to said outer sleeve through said inner member and said anvil at the end of said forward stroke of said anvil.

6. In a device for setting fasteners wherein a securing stem is pulled through a head of the fastener while reaction force is applied to said head and wherein a locking collar is pressed into said head and around said stem after the fastener is set for locking said stem and head together, the combination with (a) a holder casing
(b) an outer sleeve extended from said casing and held by said casing so as to be pressed against said head
(c) a nose on said outer sleeve fitting over said head to exert reaction force thereon when said casing and sleeve are pressed toward said head
(d) an inner member reciprocable in said outer sleeve
(e) an anvil engaged by said inner member and extended through the nose of said outer sleeve and being capable of applying reaction force to said locking collar to press it into said head and around said stem for locking the same together;

of a power applying mechanism for pulling said stem and for applying reaction force sequentially to said outer sleeve, to said anvil and through said anvil again to said outer sleeve comprising (f) a hollow shift piston reciprocable in said holder casing
(g) means on said shift piston to engage said inner member for exerting reaction force on said anvil when said shift piston is moved in said holder casing toward said nose
(h) a pulling piston reciprocable in said shift piston
(i) stem gripping and pulling means inside of said inner member for gripping and pulling said stem inserted through said nose and through said anvil
(j) a piston rod extended from said pulling piston and connected to said gripping and pulling means for pulling said gripping and pulling means when said pulling piston is moved in said shift piston away from said nose
(k) resiliently yieldable means between said shift piston and said pulling piston to urge said pistons into an initial position wherein said pulling piston is held at the end of its forward stroke toward said nose and said shift piston is held at the end of its rearward stroke away from said nose,
(l) a system of passages for pressure medium to conduct pressure medium at will on the forward side of said pistons so as to move said pulling piston rearwardly away from said nose in said shift piston thereby to pull said gripping and pulling means for gripping and pulling said stem
(m) normally closed valve means in said pulling piston to prevent escape of the pressure medium through said piston
(n) valve opening means in the holder casing extended toward said pulling piston to engage and open said valve means at the end of the rearward stroke of said pulling piston and to conduct said pressure medium between the rear end of said shift piston and said holder casing for shifting said shift piston forwardly toward said nose thereby to exert reaction force on said inner member and on said anvil
(o) said valve opening means being adjustable relatively to said piston thereby to predetermine the pulling stroke of said pulling piston (p) said anvil being engageable with said outer sleeve at the end of the forward stroke of said anvil to exert further reaction force on said outer sleeve for the breaking of said stem.

7. The device as defined in claim 6
(q) said valve opening means including a hollow boss extended into said shift piston
(r) a hollow abutment slidably and non-rotatably held in said boss
(s) an adjusting element extended into and connected to said hollow abutment for adjusting the axial position of said hollow abutment relatively to said piston
(t) a system of passages extending through said valve means and through said hollow abutment and hollow boss to conduct pressure medium from said pulling piston to the space behind said shifting piston for shifting said shift piston forwardly toward said nose.

8. The device as defined in claim 7, and
(u) means extended through the forward end of said shift piston to initially space said pulling piston from the forward end of said shift piston and
(v) adjustable means on said casing to space said shift piston from the end of said hollow casing.

9. The device as defined in claim 7, and
(u) a closure at each end of said holder casing
(v) said connecting means between said hollow abutment and said shift piston extending through the rear closure of said holder casing
(w) means to rotatably hold said adjusting element in the rear closure of the casing and said connection between said adjusting element and said abutment being threaded for adjusting said abutment by turning said adjusting element in respective directions.

10. The device as defined in claim 7, and
(u) said valve means in the pulling piston including a hollow valve stem slidably extended through said pulling piston
(v) a valve head on said stem bearing against the forward side of the pulling piston
(w) resiliently yieldable means to press the valve head against the forward side of the pulling piston
(x) said hollow valve stem having apertures exposed when said valve is pushed back by said hollow abutment at the end of the pulling stroke of the pulling piston.

11. The device as defined in claim 6, and
(q) said holder casing having a base with inlet and outlet ports for said system of passages extended through said base
(r) an adapter member fitting said base and said inlet and outlet ports for mounting said holder casing on a power supplying gun
(s) said adapter having passages therethrough to connect said inlet and outlet ports to the respective conduits of said power supply means.

References Cited by the Examiner
UNITED STATES PATENTS

| | | | |
|---|---|---|---|
| 2,526,956 | 10/1950 | Kugler | 60—54.5 |
| 3,038,626 | 6/1962 | Simmons | 72—391 |
| 3,039,270 | 6/1962 | Simmons | 60—54.5 |
| 3,042,244 | 7/1962 | Van Hecke | 72—391 |
| 3,107,806 | 10/1963 | Van Hecke | 72—391 |
| 3,187,546 | 6/1965 | Simmons | 72—391 |

CHARLES W. LANHAM, *Primary Examiner.*

G. P. CROSBY, *Assistant Examiner.*